(12) United States Patent
Matsuno et al.

(10) Patent No.: US 8,280,224 B2
(45) Date of Patent: *Oct. 2, 2012

(54) INFORMATION RECORDING APPARATUS AND INFORMATION RECORDING METHOD

(75) Inventors: Katsumi Matsuno, Kanagawa (JP); Kenichiro Aridome, Kanagawa (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 161 days.

This patent is subject to a terminal disclaimer.

(21) Appl. No.: 12/799,486

(22) Filed: Apr. 26, 2010

(65) Prior Publication Data

US 2010/0215345 A1    Aug. 26, 2010

Related U.S. Application Data

(63) Continuation of application No. 10/737,984, filed on Dec. 17, 2003, now Pat. No. 7,738,765.

(30) Foreign Application Priority Data

Dec. 18, 2002   (JP) ................................. 2002-366621

(51) Int. Cl.
*H04N 9/80* (2006.01)
(52) U.S. Cl. ...................................................... 386/243
(58) Field of Classification Search .................. 386/243, 386/282, 240, 248, 247
See application file for complete search history.

(56) References Cited

U.S. PATENT DOCUMENTS

| 5,963,204 | A | 10/1999 | Ikeda et al. |
| 6,014,170 | A | 1/2000 | Pont et al. |
| 6,154,601 | A | 11/2000 | Yaegashi et al. |
| 6,360,057 | B1 * | 3/2002 | Tsumagari et al. ........... 386/241 |
| 6,532,039 | B2 | 3/2003 | Anderson |

(Continued)

FOREIGN PATENT DOCUMENTS

CN    1137154    12/1996

(Continued)

OTHER PUBLICATIONS

Author: Michael G. Christel, Alexander G. Hauptmann, Adrienne S. Warmack, Scott A. Crosby. Title: Adjustable Filmstrips and Skims as Abstractions for a Digital Video Library. Research and Technology Advances in Digital Libraries, 1999. ADL '99. Proceedings. IEEE Forum on (0-7695-0219-9) 1999. p. 98-104.*

(Continued)

*Primary Examiner* — William C Vaughn, Jr.
*Assistant Examiner* — Tat Chio
(74) *Attorney, Agent, or Firm* — Lerner, David, Littenberg, Krumholz & Mentlik, LLP

(57) ABSTRACT

An information recording apparatus is disclosed which comprises: a first recording element for recording input picture information in units of recording into a first area of a recording medium; a representative data generating element for generating representative data representing the picture information recorded in the units of recording; a first memory for recording a plurality of symbolic pictures; a second memory for recording a program for generating link information linking the plurality of symbolic pictures recorded in the first memory with the representative data; a link information generating element for generating the link information using program; a picture generating element which, based on the link information, generates picture information including at least the symbolic pictures and the representative data being linked with one another; and a second recording element for recording the picture information generated by the picture generating element to a second area of the recording medium.

13 Claims, 16 Drawing Sheets

U.S. PATENT DOCUMENTS

| | | | |
|---|---|---|---|
| 6,553,180 B1 * | 4/2003 | Kikuchi et al. | 386/241 |
| 6,889,001 B1 | 5/2005 | Nikaido et al. | |
| 7,738,765 B2 * | 6/2010 | Matsuno et al. | 386/247 |

FOREIGN PATENT DOCUMENTS

| | | |
|---|---|---|
| CN | 1375164 | 10/2002 |
| EP | 0 731 469 | 9/1996 |
| JP | 10-078784 A | 3/1998 |
| JP | 10143175 A | 5/1998 |
| JP | 10-341396 | 12/1998 |
| JP | 11-215466 | 8/1999 |
| JP | 2000-021089 A | 1/2000 |
| JP | 2000-285646 | 10/2000 |
| JP | 2001-249669 A | 9/2001 |
| JP | 2002-063765 | 2/2002 |
| JP | 2002252826 | 9/2002 |
| WO | 00/33576 | 6/2000 |

OTHER PUBLICATIONS

Office Action from Japanese Application No. 2002-366621, dated Aug. 26, 2010.

* cited by examiner

FIG. 7

| | | | | | | | |
|---|---|---|---|---|---|---|---|
| STEP1 | Rzone 1 | Rzone 2 | | | | | |
| STEP2 | Rzone 1 | Rzone 2 | VTSTT_VOBS | VTSI_BUP | | | |
| STEP3 | Rzone 1 | VTSI / TMP VMGI | VTSTT_VOBS | VTSI_BUP | | | |
| STEP4 | Rzone 1 | VTS #1 | | | Rzone 3 | Invisible Rzone | |
| STEP5 | Rzone 1 | VTS #1 | | | Rzone 3 | VTSTT_VOBS | VTSI_BUP |
| STEP6 | Rzone 1 | VTS #1 | | | VTSI / TMP VMGI | VTSTT_VOBS | VTSI_BUP |
| STEP7 | Rzone 1 | VTS #1 | | | VTS #2 | | |
| STEP k | Lead in | UDF | VMG | VTS #1 | VTS #2 | ... | VTS #N | Lead out |

FIG. 8

| STEP1 | Padding | | | | | |
|---|---|---|---|---|---|---|
| STEP2 | Padding | VTSTT_VOBS | VTSI_BUP | Padding | | |
| STEP3 | Padding | TMP VMGI | Padding | VTSI | VTSTT_VOBS | VTSI_BUP | Padding |
| STEP4 | Padding | TMP VMGI | Padding | VTS #1 | Padding | VTSI | VTSTT_VOBS | VTSI_BUP | Padding |
| STEP5 | Padding | TMP VMGI | Padding | VTS #1 | VTSTT_VOBS | VTSI_BUP | Padding |
| STEP6 | Padding | TMP VMGI | Padding | VTS #1 | VTS #2 | Padding |
| STEP k | Lead in | UDF | TMP VMGI | VMG | VTS #1 | VTS #2 | ... | VTS #N | Lead out |

F I G. 15

| | |
|---|---|
| | SETTING DATA COMMON TO ALL PAGES |
| RECORDING TIME CONDITION-FURNISHED DATA #1 | FROM JAN. 1, * TO JAN. 3, * |
| RECORDING TIME CONDITION-FURNISHED DATA #2 | PAGE SETTING DATA FOR THE HAPPY NEW YEAR VERSION |
| RECORDING TIME CONDITION-FURNISHED DATA #3 | JAN. 27, * |
| | POINTER TO PAGE SETTING DATA |
| | SEP. 13, * |
| | PAGE SETTING DATA FOR THE HAPPY BIRTHDAY VERSION |
| RECORDING TIME CONDITION-FURNISHED DATA #4 | FROM DEC. 24, * TO DEC. 25, * |
| | PAGE SETTING DATA FOR THE MERRY CHRISTMAS VERSION |
| RECORDING TIME CONDITION-FURNISHED DATA #5 | FROM MAR. *, * TO MAY*, * |
| | SATURDAY AND SUNDAYS |
| | PAGE SETTING DATA FOR THE SPRING HOLIDAY VERSION |
| RECORDING TIME CONDITION-FURNISHED DATA #6 | FROM MAR. *, * TO MAY. *, * |
| | PAGE SETTING DATA FOR THE SPRING VERSION |

(CONTINUED TO RIGHT)

| | |
|---|---|
| RECORDING TIME CONDITION-FURNISHED DATA #7 | FROM JUL. *, * TO AUG. *, * |
| | PAGE SETTING DATA FOR THE SUMMER VERSION |
| RECORDING TIME CONDITION-FURNISHED DATA #8 | FROM SEP. *, * TO NOV. *, * |
| | SATURDAY AND SUNDAYS |
| | PAGE SETTING DATA FOR THE AUTUMN HOLIDAY VERSION |
| RECORDING TIME CONDITION-FURNISHED DATA #9 | FROM SEP. *, * TO NOV. *, * |
| | PAGE SETTING DATA FOR THE AUTUMN VERSION |
| RECORDING TIME CONDITION-FURNISHED DATA #10 | FROM DEC. *, * TO FEB. *, * |
| | SATURDAYS AND SUNDAYS |
| | PAGE SETTING DATA FOR THE WINTER HOLIDAY VERSION |
| RECORDING TIME CONDITION-FURNISHED DATA #11 | FROM DEC. *, * TO FEB. *, * |
| | PAGE SETTING DATA FOR THE WINTER VERSION |
| RECORDING TIME CONDITION-FURNISHED DATA #12 | FROM *. *, * TO *, * |
| | PAGE SETTING DATA FOR THE MISCELLANEOUS VERSION |

INFORMATION RECORDING APPARATUS AND INFORMATION RECORDING METHOD

CROSS-REFERENCE TO RELATED APPLICATIONS

This application is a continuation of U.S. application Ser. No. 10/737,984, filed on Dec. 17, 2003, the disclosure of which is hereby incorporated by reference herein.

BACKGROUND OF THE INVENTION

The present invention relates to an information recording apparatus and an information recording method. More particularly, the invention relates to an information recording apparatus and an information recording method for simply creating a menu screen for each of different users who have recorded their picture signals on a single recording medium, the menu being created at a finalizing time.

Conventionally, content is recorded on the medium in a predetermined menu format. When a user selects a desired menu of the content, a hierarchical menu structure is presented for the user to select necessary items so as to establish required functions or to make other settings. One such menu scheme is disclosed illustratively in Japanese Patent Laid-Open No. 2002-63765, in particular on page 7 with reference to the accompanying FIG. 1.

One disadvantage of the conventional menu format is that the way of presenting menus of the content recorded on the medium is rigidly fixed. Users are unable to alter the menu format in keeping with their preferences or according to the type of the content of interest. Another disadvantage is that it is impossible to express the passage of time or the sense of the seasons by changing the format of each menu page depending on the date or the time of day. A further disadvantage is that although content is recorded on a given recording medium in a format allowing other apparatuses to reproduce the recorded content subsequently, the content menu screen appears in a manner dependent on each specific reproducing apparatus being used. It is impossible to display the same menu screen preferred by the user on every reproducing apparatus that may be used.

Under the above circumstances, what is desired is for each of a plurality of users having recorded contents onto a single recording medium to create easily a menu specific to each user's recorded content.

SUMMARY OF THE INVENTION

In achieving the foregoing and other objects of the present invention and according to a first aspect thereof, there is provided an information recording apparatus comprising: a first recording element for recording input picture information in units of recording into a first area of a recording medium; a representative data generating element for generating representative data representing the picture information recorded in the units of recording; a first memory for recording a plurality of symbolic pictures; a second memory for recording a program for generating link information linking the plurality of symbolic pictures recorded in the first memory with the representative data; a link information generating element for generating the link information using program; a picture generating element which, based on the link information, generates picture information including at least the symbolic pictures and the representative data being linked with one another; and a second recording element for recording the picture information generated by the picture generating element to a second area of the recording medium.

In the inventive information recording apparatus, the program may generate the link information based on setting information established upon recording of the input picture information by the first recording element.

The program may also generate the link information based on an identification code specific to the recording medium.

The information recording apparatus may further comprise an interface for interfacing with an external device connected via a network, wherein the symbolic pictures may be recorded to the first memory from the external device through the interface.

The information recording apparatus may further comprise an interface for interfacing with an external device connected via a network, wherein the program may be recorded to the second memory from the external device through the interface.

According to a second aspect of the invention, there is provided an information recording method comprising the steps of: recording input picture information in units of recording into a first area of a recording medium; generating representative data representing the picture information recorded in the units of recording; recording to a second memory a program for generating link information linking a plurality of symbolic pictures recorded in a first memory with the representative data; generating the link information using the program; based on the link information, generating picture information including at least the symbolic pictures and the representative data being linked with one another; and recording the generated picture information to a second area of the recording medium.

Where the inventive information recording method is in use, the program may generate the link information based on setting information established upon recording of the input picture information to the first area of the recording medium.

The program may also generate the link information based on an identification code specific to the recording medium.

According to the information recording method of the invention, the symbolic pictures may be recorded to the first memory from an external device through an interface.

Also according to the inventive information recording method, the program may be recorded to the second memory from an external device through an interface.

The apparatus and method of the invention enable each of the users having numerous contents recorded onto the recording medium to create desired menu display screens about their own contents. The screens allow each user to extract a desired content or to categorize recorded contents as desired in an effortless, simplified manner. This feature provides users with more choices of menu display screens than before depending on the purpose.

The menu screens thus created may be recorded onto the recording medium in a format allowing other reproducing devices to reproduce the menus the same way as the content. This allows the user-selected menu screens to be reproduced in a manner independent of the different types of reproducing apparatuses that may be used.

BRIEF DESCRIPTION OF THE DRAWINGS

Further objects and advantages of this invention will become apparent upon a reading of the following description and appended drawings in which:

FIG. 7 is an explanatory view showing an INC (incremental recording) procedure;

FIG. 8 is an explanatory view depicting a ROW (restricted overwrite) procedure;

FIG. 15 is an explanatory view showing another structure of the program for generating menu screens.

DETAILED DESCRIPTION OF THE PREFERRED EMBODIMENTS

Preferred embodiments of the information recording apparatus and information recording method according to the invention will now be described with reference to the accompanying drawings.

Figure 1:
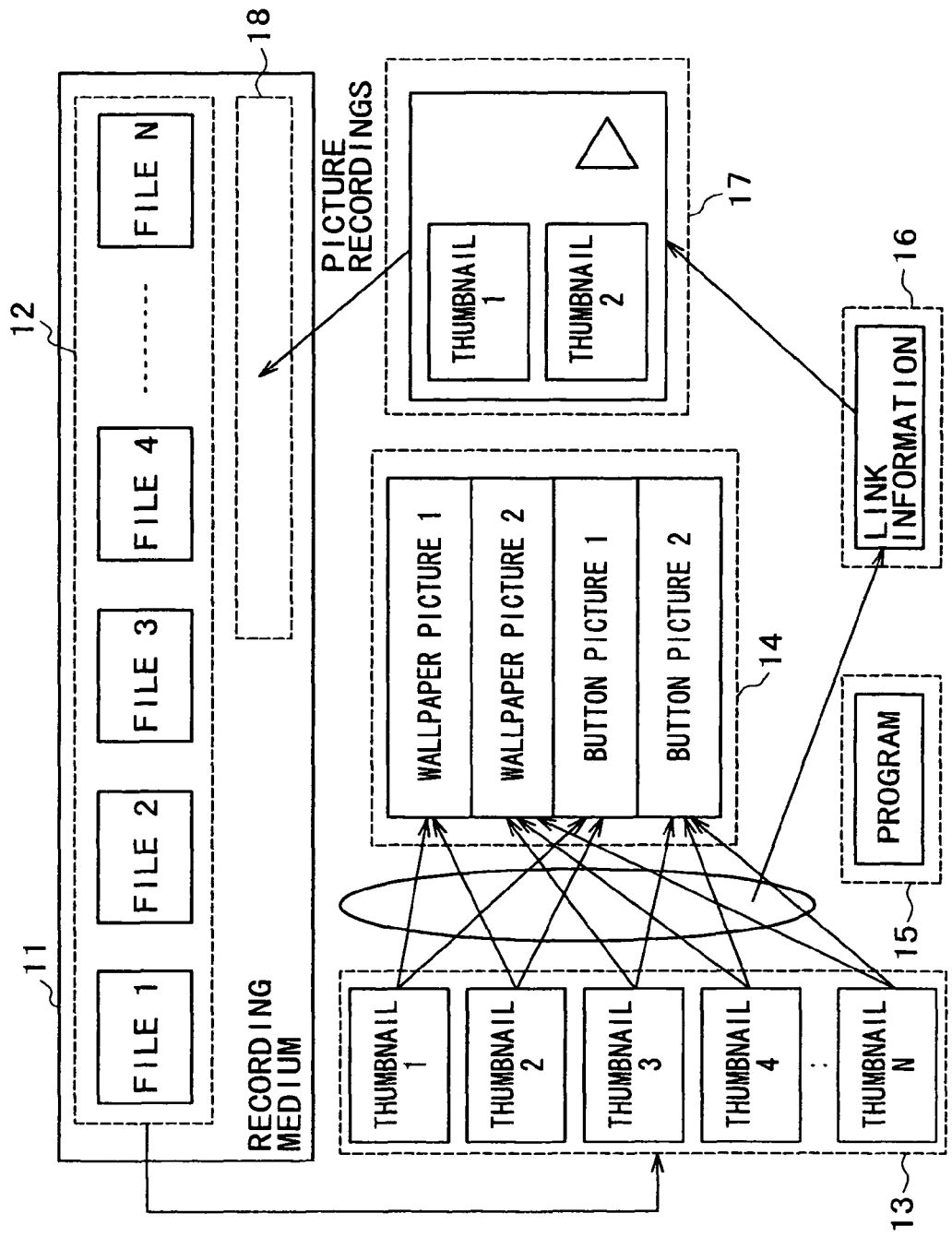
FIG. 1 is a schematic block diagram of an information recording apparatus implementing an information recording method and practiced as a first embodiment of the invention.

As shown in FIG. 1, the information recording apparatus practiced as the first embodiment of this invention comprises: a first recording element for recording input picture information in units of recording to a first area 12 of a recording medium 11; a representative data generating element 13 for generating representative data representing picture information in units of recording; a first memory 14 for storing a plurality of symbolic pictures; a second memory 15 for storing a program for generating link information linking the plurality of symbolic pictures in the first memory 14 with the representative data; a link information generating element 16 for generating the link information using the program; a picture generating element 17 which, based on the link information, generates picture information including at least the symbolic pictures and the representative data being linked with one another; and a second recording element for recording the picture information generated by the picture generating element 17 to a second area 18 of the recording medium 11.

The symbolic pictures are pictures for general use, such as wallpapers and button images. The representative data include not only thumbnails but also picture information-related data, such as titles and other text data as well as markings attached by users to the picture information.

The program is one which generates link information based on setting information established upon recording of picture information by the first recording element. The program also generates the link information based on an identification code specific to the recording medium 11. The setting information is made up of user information, recording date and time information, and position information such as GPS coordinates in effect at the time of recording.

In the information recording apparatus of the above structure, diverse contents are recorded on the recording medium 11 in units of files (files 1, 2, ..., N). The files 1, 2, ..., N are represented by representative data such as thumbnails 1, 2, ..., N, respectively. Choosing any one of the thumbnails causes the corresponding file to be selected. The symbolic pictures illustratively include wallpaper pictures 1 and 2 and button pictures 1 and 2, which are held in the first memory 14 and ready to be selected.

When, say, the thumbnail 1 of a given content is selected, the link information generating element 16 overlays a symbolic picture such as the wallpaper picture 1 onto the background of the thumbnail 1. The overlaid representative data (thumbnails 1 and 2 in the example of FIG. 1) and symbolic picture (wallpaper picture 1 in the example of FIG. 1) are written to the second area 18 of the recording medium 11 for storage.

With other contents, their representative data are likewise selected in conjunction with symbolic pictures. The representative data and symbolic pictures are overlaid and recorded similarly to the second area 18 of the recording medium 11 for storage.

Any of the stored symbolic pictures may be selected by the user. Alternatively, a predetermined picture may be selected automatically. A specific symbolic picture may also be selected automatically depending on the type of content. For example, a file containing sports-related images may be represented by a suitable picture symbolizing sports (i.e., called the sports version); a file containing images taken at an athletic meet may be represented by a picture symbolizing the athletic meet (i.e., athletic meet version).

The selection of representative data is not limited to the thumbnails extracted from the actually recorded picture data. Alternatively, representative data may be constituted by a time stamp at which a particular picture was taken, by a character code or a pattern expressing the atmosphere of the imaged scene, or by anything that represents or identifies what is recorded. In short, representative data may be anything provided a glance at a menu screen containing the representative data in question can readily invoke the nature of the corresponding content.

Multiple files made of a plurality of contents recorded on the recording medium 11 may be identified according to the nature of the contents by a suitably created menu screen. This allows a plurality of files held on the recording medium to be managed in an easy, rationalized manner. Where a plurality of users share the recording medium 11, the embodiment of the invention enables each user to manage his or her own files illustratively by genre or by the time stamp indicative of the date and time of each recording. The techniques involved with the embodiment are vastly effective in creating useful menu screens.

Figure 2:
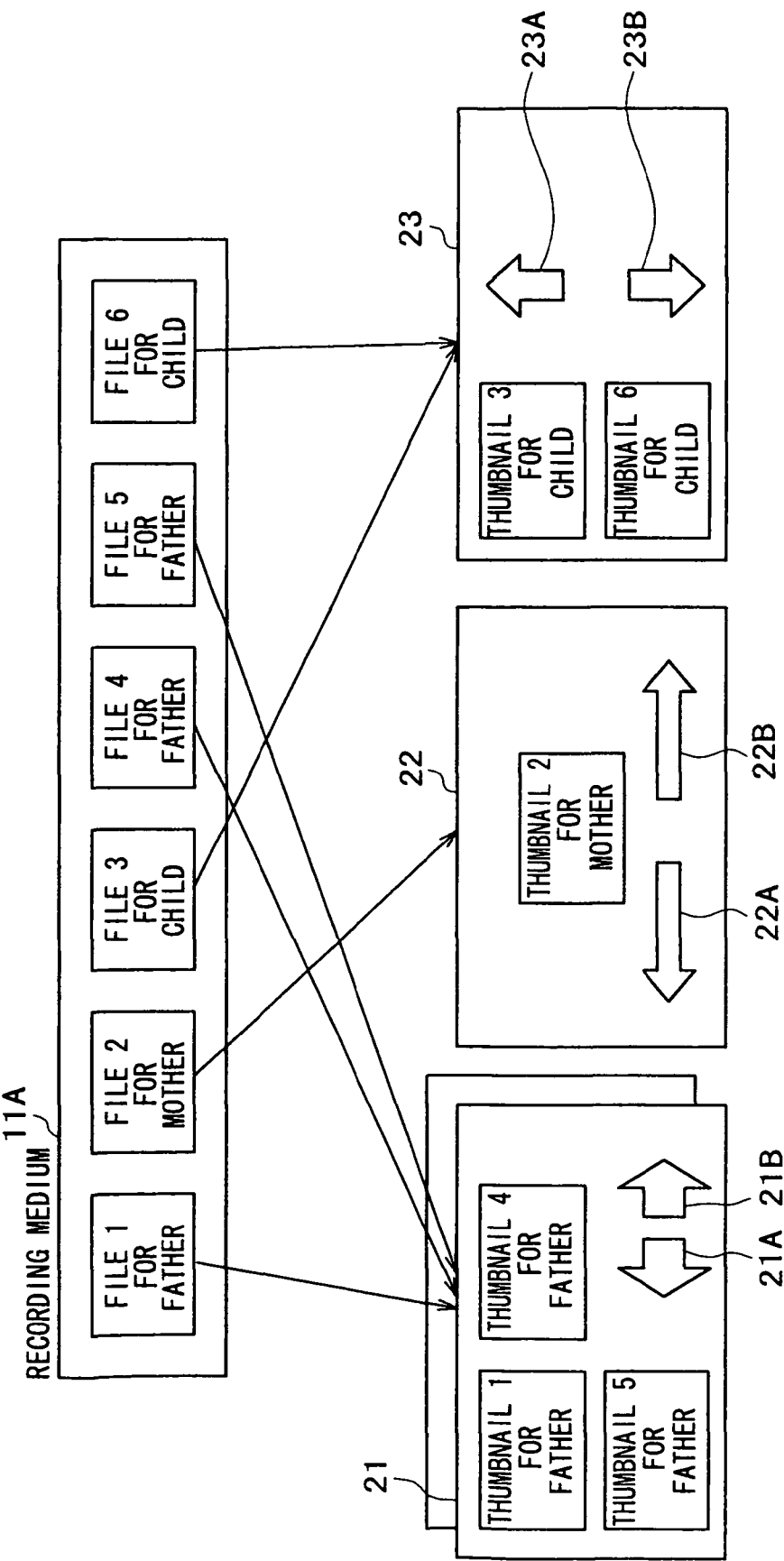
FIG. 2 is a schematic block diagram of the information recording apparatus comprising a single recording medium.

Illustrated in FIG. 2 is an inventive technique of creating menus for use by a plurality of users such as family members sharing one recording medium 11A. Where different users have their picture signals recorded on the single recording medium 11A, each user may have his or her user menu (i.e., menu screen) created at a finalizing time.

Where a number of people share one information apparatus and keep their different bodies of information recorded on a single recording medium, it is useful to create a user menu for each user. Naturally, if a large number of files exist on the recording medium, multiple user menus can be created for each of the users involved.

A program is provided to determine the maximum number of representative pictures such as thumbnails included in a single menu screen and the types of symbolic pictures to be used. The program, to be set up as desired by the user, reduces the size and the resolution of thumbnails in a suitably automated manner if they are getting numerous on a single menu screen.

Suppose that, of the files with contents recorded on the recording medium 11A, files 1, 4 and 5 belong to the father, a file 2 belongs to the mother, and files 3 and 6 belong to a child, as shown in FIG. 2. In that case, a user menu 21 is created to include thumbnails 1, 4 and 5 representative of the files 1, 4 and 5 for the father. A plurality of user menus 21 are provided for the father, and the first of them is shown.

In the user menu 21 shown, the thumbnails 1, 4 and 5 constitute representative data. Also included in the user menu 21 are symbolic pictures making up buttons operated to execute transition to the preceding or the following page. The second area (see FIG. 1) to which to store the representative data and symbolic pictures is not shown in FIG. 2.

A user menu 22 is created to include a thumbnail 2 representing the file 2 for the mother. Although only one user menu 22 is shown to be furnished for the mother, more user menus 22 for the same person may be created as needed.

A user menu 23 is created to include thumbnails 3 and 6 representing the files 3 and 6 for the child. This single menu 23 for the child may also be supplemented with more user menus 23 if necessary.

Although the user menus 21, 22 and 23 are shown to be created in terms of family members (father, mother and child), this is not limitative of the invention. Menus when created can also be categorized by genre: the seasons, mountains, beaches, foreign countries, travels, etc.; the menus may also be grouped by date or by time of day as mentioned earlier.

Figure 3:
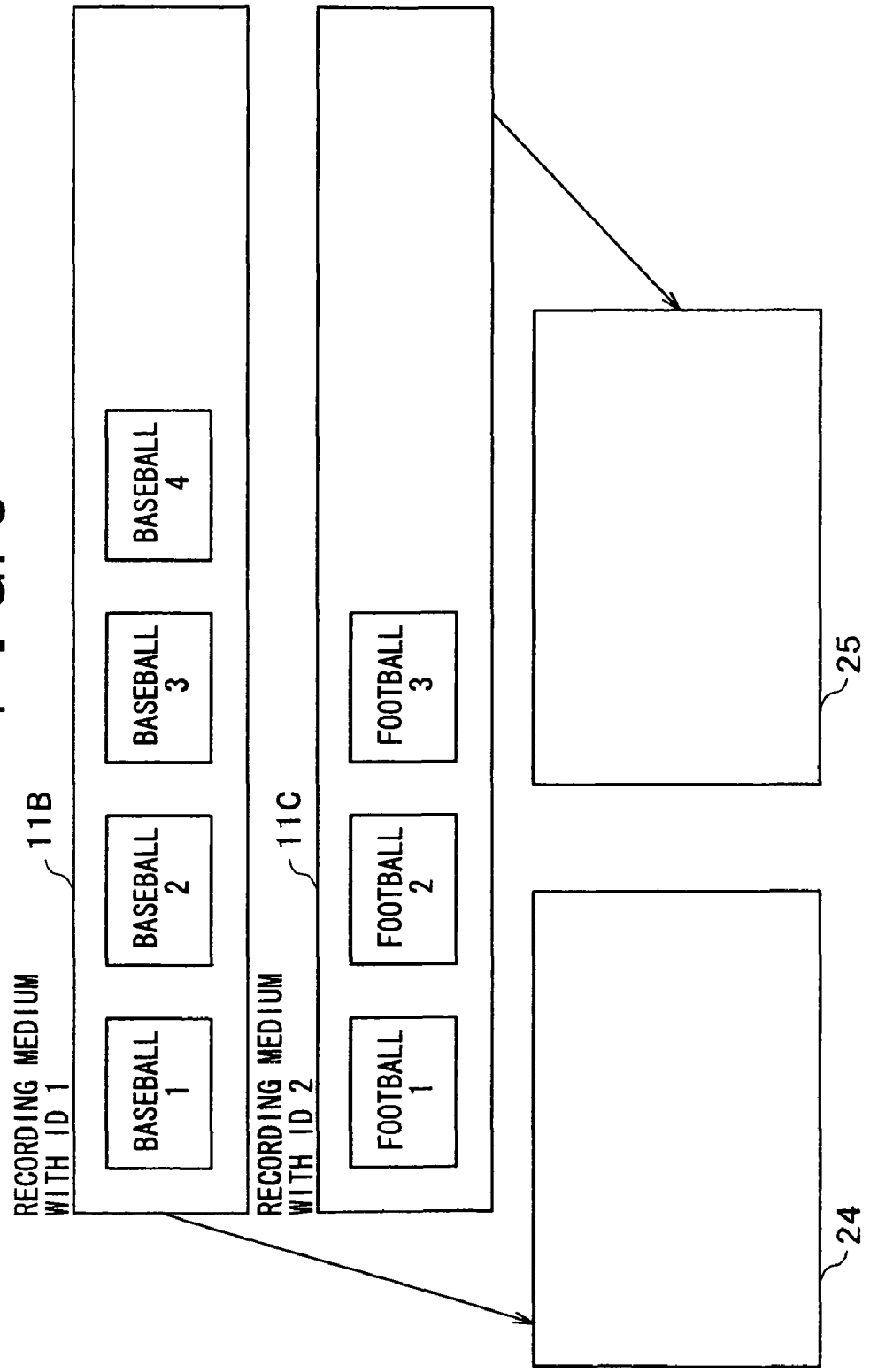
FIG. 3 is a schematic block diagram of the information recording apparatus comprising a plurality of recording media.

Shown in FIG. 3 is a menu-creating technique for use where there exist a plurality of recording media 11B and 11C identified by a specific ID (identification) number each, the technique being used to create a menu screen 24 for the recording medium 11B and a menu screen 25 for the recording medium 11C. One advantage of this technique is that recorded contents can be managed in units of the numerous recording media 11B and 11C each with a specific ID, illustratively on a disc-by-disc basis.

For example, if a first recording medium (ID1) 11B accommodates baseball-related files "baseball 1," "baseball 2," "baseball 3" and "baseball 4," the user may creates a baseball menu screen 24 for the first recording medium 11B using a wallpaper picture (symbolic picture; see FIG. 1) related to baseball (baseball version).

If a second recording medium (ID2) 11C retains football-related files "football 1," "football 2" and "football 3," the user may create a football menu screen 25 for the second recording medium 11C using another wallpaper picture (symbolic picture; see FIG. 1) related to football (football version).

The information recording apparatus, when loaded with the recording medium 11B or 11C, stores internally the identification number of the loaded recording medium for menu management purposes. When a recording medium is loaded for the first time, default background and button pictures are generally used to create a menu specific to the medium. This menu-creating technique is basically the same as that discussed in connection with FIG. 1 and thus will not be described further. The difference is that a menu screen is created specifically for each recording medium having its own identification number, using a program based on link information linking two kinds of pictures: representative pictures such as thumbnails and titles in text representative of files and retained on the recording medium on the one hand, and symbolic pictures held internally by the information recording apparatus on the other hand.

Preferably, when a recording medium is loaded into the information recording apparatus for the first time, arrangements can be made so as to inform the user of the first-ever loading and to prompt the user to edit the menu-creating program accordingly. Needless to say, the identification numbers (ID) of the recording media 11B and 11C may be any numbers or codes selected by the user.

Figure 4:
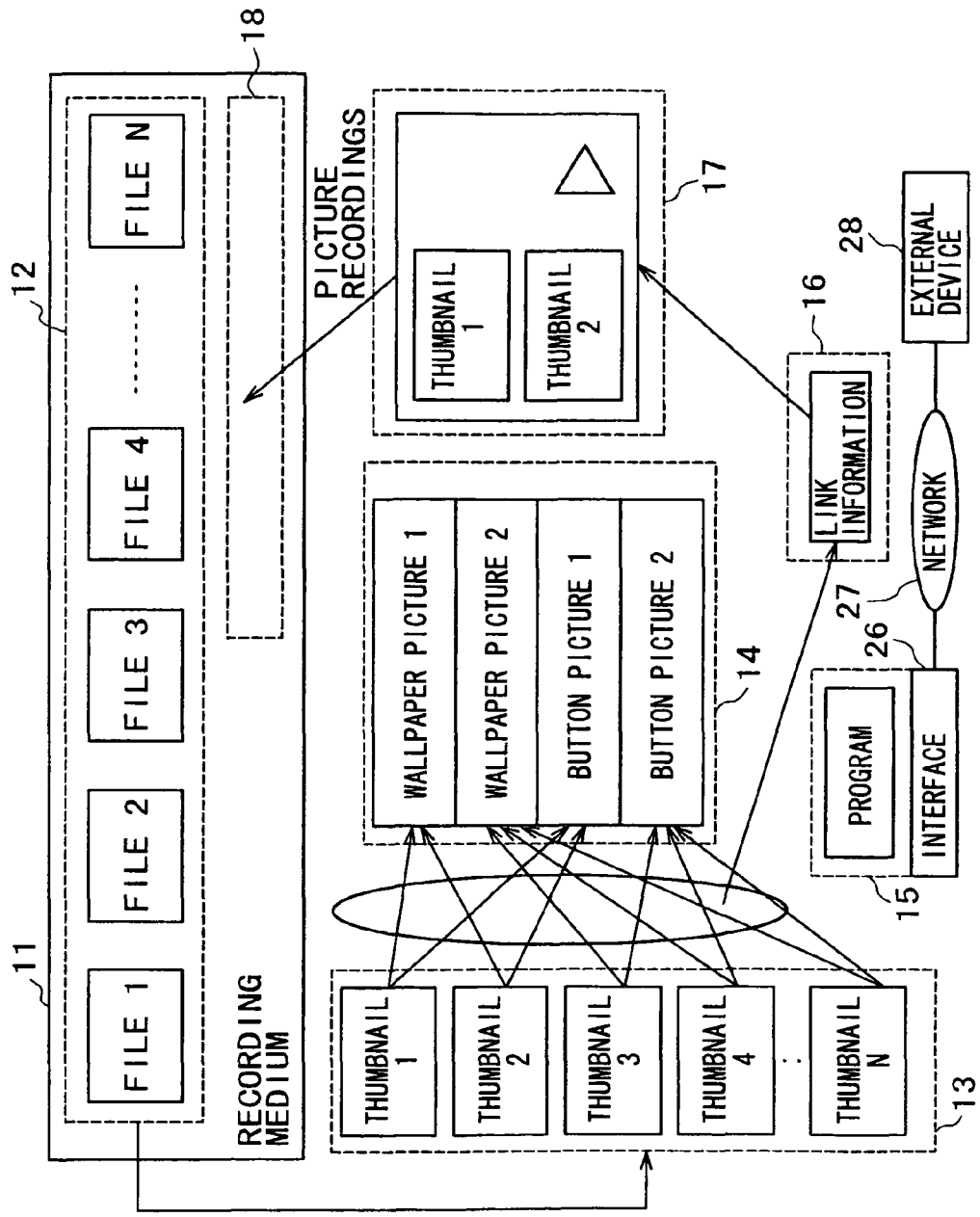
FIG. 4 is a schematic block diagram of an information recording apparatus implementing an information recording method and practiced as a second embodiment of the invention.

The information recording apparatus practiced as the second embodiment of this invention will now be described with reference to the relevant accompanying drawings. Compared with the first embodiment discussed above, the second embodiment involves acquiring over a network either the program for overlaying representative data (e.g., thumbnails) on symbolic pictures (backgrounds, etc.), or symbolic pictures. As shown in FIG. 4, the second embodiment comprises: a first recording element for recording input picture information in units of recording to a first area 12 of a recording medium 11; a representative data generating element 13 for generating representative data representing the picture information in units of recording; a first memory 14 for storing a plurality of symbolic pictures; a second memory 15 for storing a program for generating link information linking the plurality of symbolic pictures in the first memory 14 with the representative data; a link information generating element 16 for generating the link information using the program; a picture generating element 17 which, based on the link information, generates picture information including at least the symbolic pictures and the representative data being linked with one another; a second recording element for recording the picture information generated by the picture generating element 17 to a second area 18 of the recording medium 11; and a memory storing element which includes an interface 26 interfacing to an external device 28 connected via a network 27 and which records to the first or second memory 14 or 15 the symbolic pictures or the program received from the external device 28 through the interface 26.

Where the second embodiment of the above structure is in use, the technique of selecting representative data and symbolic pictures and of composing the selected data and pictures into a menu screen is the same as with the first embodiment and thus will not be described further. The difference is that the symbolic pictures and the program for composing the representative data and symbolic pictures may be introduced from the external device 28 through the interface 26 and over the network 27. The structure allows a faulty program to be corrected using suitable data input automatically over the network 27, and permits renewed symbolic pictures and an updated program to be installed easily into the apparatus.

Figure 5:
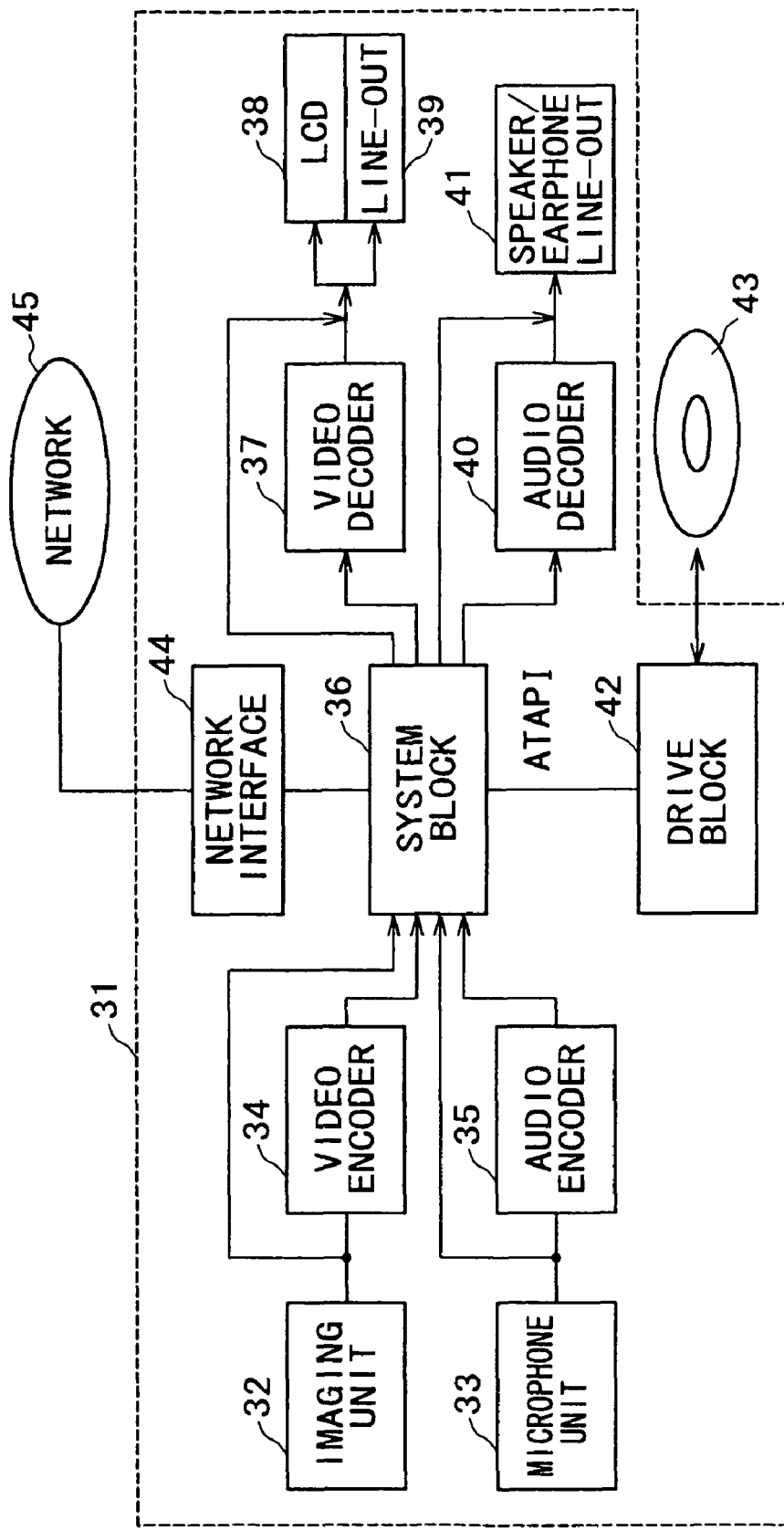
FIG. 5 is a schematic block diagram of an information recording apparatus implementing an information recording method and practiced as a third embodiment of the invention.

The information recording apparatus implementing another information recording method and practiced as the third embodiment of this invention will now be described with reference to the relevant accompanying drawings. The third embodiment is furnished typically as a video camera 31 shown in FIG. 5. The video camera 31 comprises: an imaging unit 32 for generating a video signal by taking pictures of scenery and others; a microphone unit 33 for inputting sounds; a video encoder 34 for encoding the video signal generated by the imaging unit 32; an audio encoder 35 for encoding an audio signal generated by the microphone unit 33; a system block 36 for processing the signals coming from the video encoder 34 and audio encoder 35; a video decoder 37; an LCD 38 for giving a display using the video signal output by the video decoder 37; a line-out 39 for allowing the video signal from the video decoder 37 to be output to a display unit such as a TV set for display; an audio decoder 40; a speaker/earphone/line-out 41 for outputting the audio signal from the audio decoder 40; a drive block 42 for recording video and audio signals in ATAPI format; a disc 43 acting as a recording medium when loaded into the drive block 42; and a network interface 44 controlled by the system block 36 and connected to a network 45. Also included, but not shown in FIG. 5, is a feature for supplementing the video signal generated by the imaging unit 32 with time information indicating the dates and times at which pictures were taken, and with camera setting information made of the imaging settings on the video camera such as the shutter speed and resolution.

The system block 36 controls signals for multiplexing, demultiplexing and monitoring the video and audio data, communicates with the drive block 42 through an ATAPI interface, and manages write and read operations to and from the disc 43 serving as the recording medium. When connected to the network 45, the system block 36 is used to obtain the program for creating menus for display on menu screens, to be discussed later, and to acquire symbolic pictures making up the menu screens.

The drive block 42 writes and reads data to and from the disc 43 acting as the recording medium, in accordance with commands coming from the ATAPI interface.

The network interface 44 is a block that controls connection with the network 45. More specifically, the network interface 44 is implemented to embrace diverse connection techniques based on USB (universal serial bus) and IEEE 1394 (Institute of Electrical and Electronic Engineers 1394; SCSI standard) connection standards, on wired network interface standards such as LAN (local area network), and on wireless short-distance network interface standards (wireless LAN) such as Bluetooth (trademark) and IEEE 802.11b.

At the time of recording, signals flow as follows: pictures taken by the imaging unit 32 and sounds input to the microphone unit 33 are compressed by the video encoder 34 and audio encoder 35 respectively, before being multiplexed by the system block 36 and recorded to the disc 42 via the ATAPI interface. Concurrently, a monitor-use video signal is output to the line-out 39 having a display screen such as an LCD, and the audio signal is output to the earphone/line-out 41.

At the time of reproduction, the data read from the disc 43 by the drive block 42 are demultiplexed by the system block 36 before being forwarded to the video decoder 37 and audio decoder 40 for decompression back to the original signals. The signals are then output to the LCD 38 and line-out 39 as well as to the speaker/line-out 41.

Figure 6:
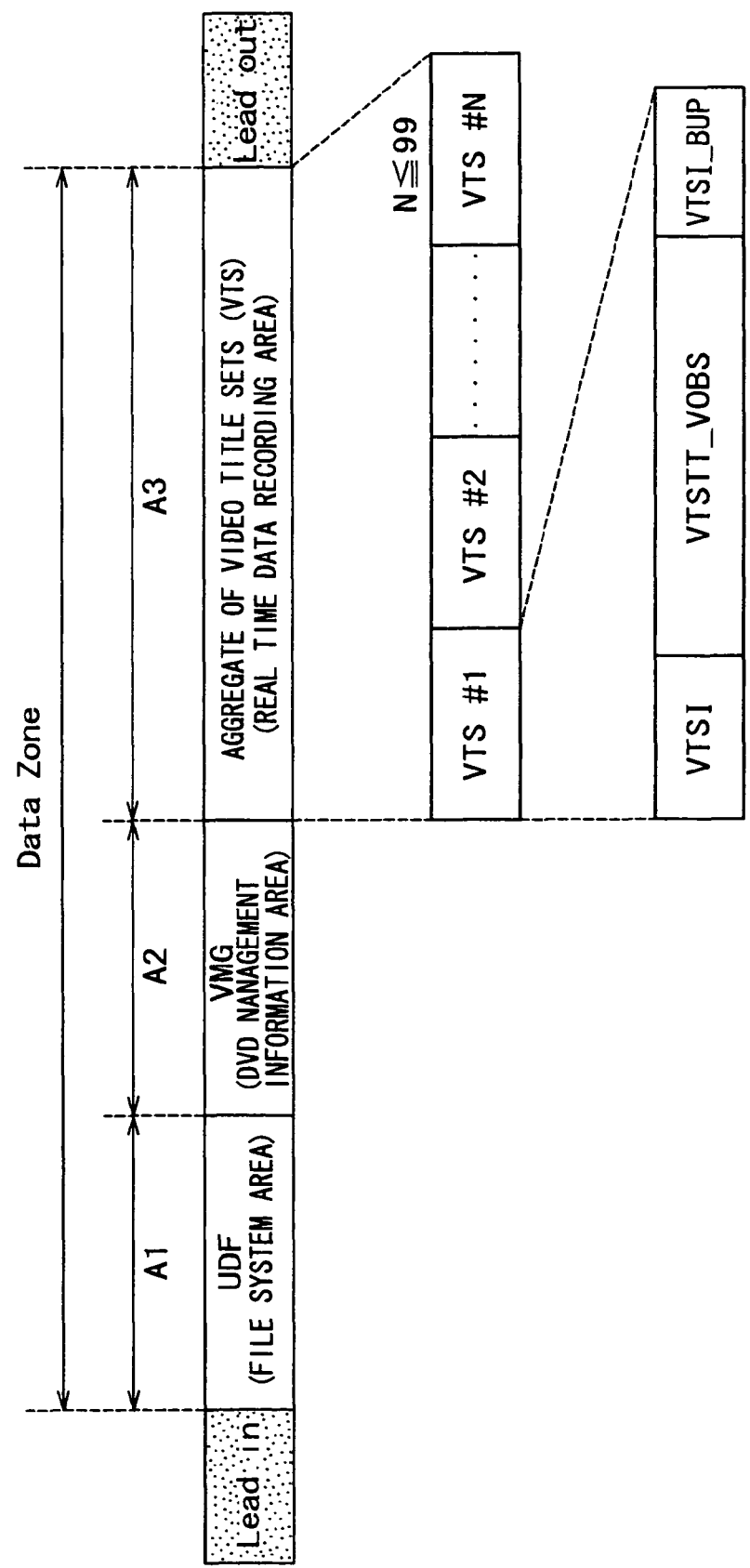
FIG. 6 is an explanatory view of a data structure on a disc.

When the third embodiment records or reproduces data to or from the disc 43, the data are in a logical format pursuant to the DVD-Video standard. As shown in FIG. 6, this logical format is constituted on the disc 43 by an inner area (lead-in), by a file system area called UDF (universal disc format), by a video data management area called VMG (video manager), and by an area for recording up to 99 VTSs (video title sets). Each VTS is made up of a VTSI (video title set information) that holds title information, a VTSTT_VOB (video object set for titles in a VTS) that constitutes actual data such as those in MPEG format, and a VTSI_BUP (backup of VTSI).

There are two write formats for DVD-RW: incremental recording (INC) and restricted overwrite (ROW). With the INC format in use, data are written sequentially to the recording medium. Once written with data, the medium cannot be overwritten. The ROW format permits overwrite but allows data to be written to blank areas solely sequentially as in the case of the INC format. Recording area information for the INC and ROW formats is managed using a recording management area (RMA) inside of the inner area (lead-in), not shown.

DVD-R media cannot be overwritten physically. For that reason, the DVD-R uses the INC format when written with data.

FIG. 7 shows steps constituting a recording procedure for the INC format. With the INC format in use, up to three areas are defined as available for a single write pass. These areas are called Rzone each, and Rzone management is carried out using RMA as well. Each of the steps involved is described below.

In step 1, UDF and two areas, one for VMG (Rzone 1) and another for VTSI (Rzone 2), are reserved. Rzone 2 is followed by an invisible Rzone where data can be effectively added.

In step 2, the recording of actual data VTSTT_VOBS is terminated. More specifically, the moment the recording which started earlier has stopped, VTSI is generated immediately and written after VTSTT_VOBS as VTSI_BUP. VTSI_BUP is used for backup management.

In step 3, to Rzone 2 are written VTSI and temporary video manager information (TMP_VMGI) for temporarily managing the actually written data. This step completes a first title (VTS #1).

In step S4, an area for title VTSI (Rzone 3) is reserved subsequent to VTS #1.

In step 5, the recording of the actual data VTSTT_VOBS is terminated. More specifically, the moment a second pass of recording which started earlier has stopped, VTSI is generated immediately and written after VTSTT_VOBS as VTSI_BUP.

In step 6, VTSI and TMP_VMGI are written to Rzone 3. This step completes a second title (VTS #2). VTS #1 and VTS #2 are recorded in TMP_VMGI.

In steps 7 through k−1, the steps above are repeated so as to record N titles (VTS #1 through VTS #N).

In step k, in order to ensure compliance with the DVD-Video format, UDF and VMG are created out of the management information on the titles in TMP_VMGI's and are written to Rzone 1. Lead-in and lead-out data are then recorded in an operation called finalizing.

FIG. 8 shows steps constituting a recording procedure for the ROW format. With the ROW format in use, all areas are defined and used as a single Rzone. Each of the steps involved is described below.

In step 1, in order to reserve areas in which to write UDF, VMG and VTSI, an address called NWA (next writable address) is advanced by use of padding such as fixed data.

In step 2, the moment the recording of actual data VTSTT_VOBS has ended, VTSI is generated immediately and written after VTSTT_VOBS as VTSI_BUP. The address NWA is then advanced by padding the VTSI area for the next title.

In step 3, VTSI is written before VTSTT_VOBS. Then TMP_VMGI is written between the UDF area and the VMG area. This step completes the first title (VTS #1).

In step 4, the moment the recording of the actual data VTSTT_VOBS has ended, VTSI is generated immediately and written after VTSTT_VOBS as VTSI_BUP. The address NWA is then advanced by padding the VTSI area for the next title.

In step 5, VTSI is written before VTSTT_VOBS. Then TMP_VMGI between the UDF area and the VMG area is overwritten. This step completes the second title (VTS #2).

In steps 6 through k−1, the steps above are repeated to record N titles (VTS #1 through VTS #N).

In step k, in order to ensure compliance with the DVD-Video format, UDF and VMG are created out of the management information on the titles in TMP_VMGI's and are written to the area reserved by padding. Lead-in and lead-out data are then recorded in the operation called finalizing.

Figure 9:
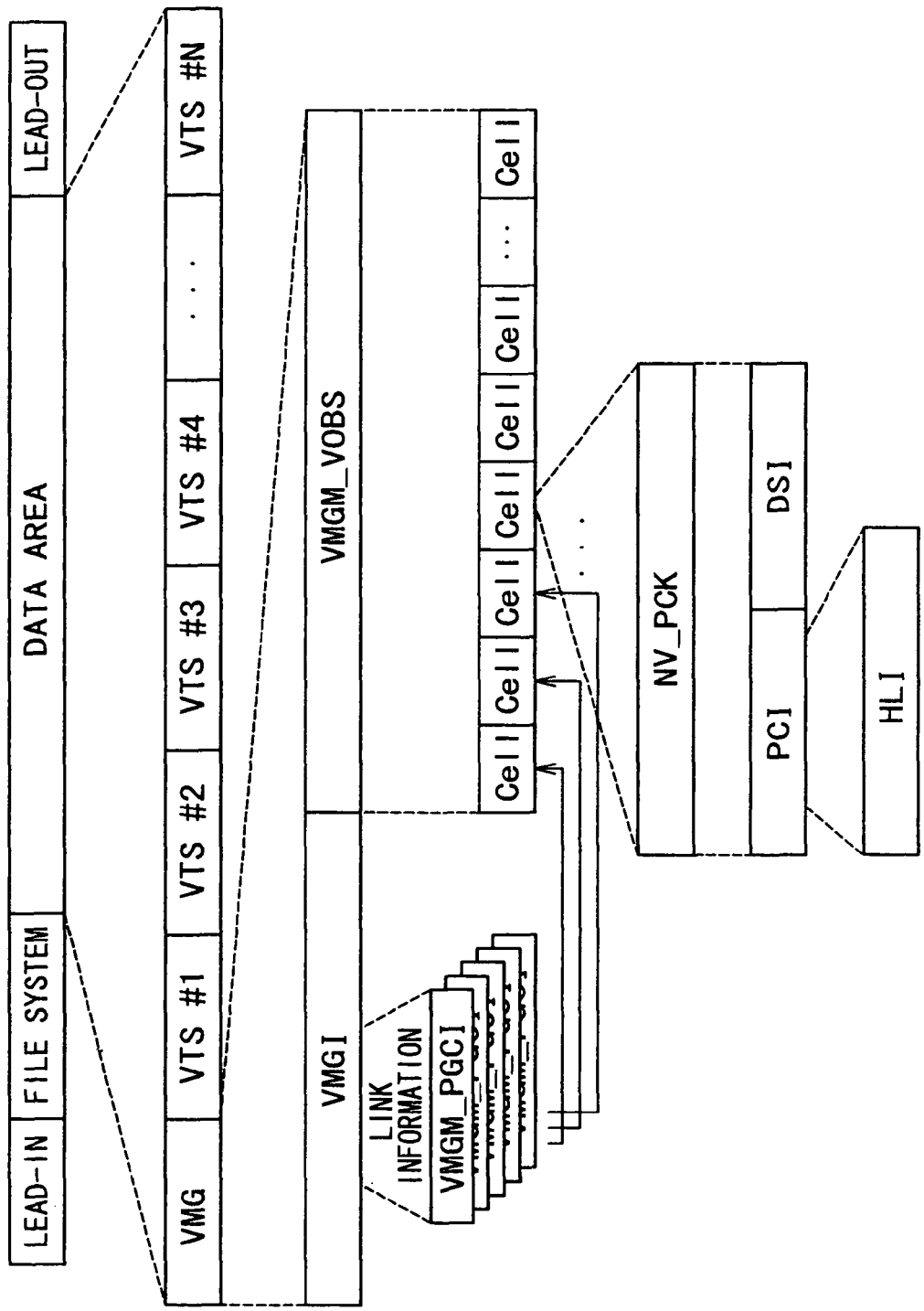
FIG. 9 is an explanatory view illustrating a menu recording structure in effect at a finalizing time.
Figure 10:
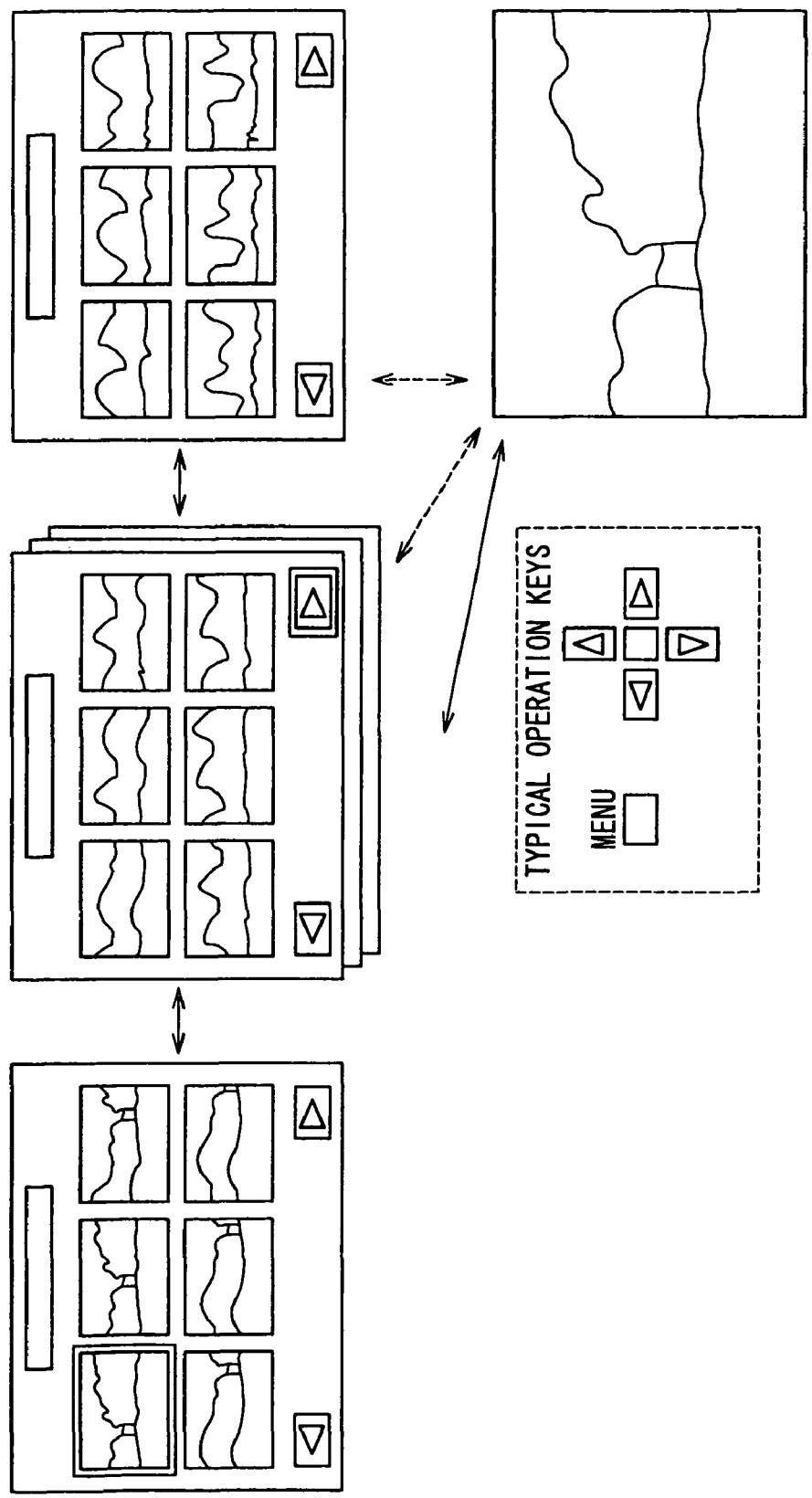
FIG. 10 is an explanatory view indicating typical menu screens in effect after the finalizing.

FIG. 9 illustrates a typical data structure of menu information recorded at the time of finalizing. FIG. 10 shows how menu screens appear when implemented with menu information.

The file system area and the data area exist between the lead-in on the innermost side and the lead-out on the outermost side of the disc 42. The data area is made up of VMG, VTS #1, VTS #2, VTS #N. VMG is composed of the management information VMGI and the actual data VMGM_VOBS for menu display purposes.

The management information VMGI includes page-feed information for transition to the preceding and the following pages. Also included in VMGI is link information VMGM_PGCI (video manager menu program chain information)

furnished for each of a plurality of cells constituting the actual data VMGM_VOBS, each cell corresponding to a single screen.

VMGM-PGCI's provide link information for linkage to titles, each title being a unit of reproduction and selected from between menu pages and from the menus. The link information is used to reproduce the title whose representative picture displayed on a menu screen is selected and designated by the user.

The actual data VMGM_VOBS is constituted by a plurality of cells each corresponding to one menu screen page as mentioned. Recorded in the cell are a menu screen background, title characters, thumbnails created out of VTS pictures, a back button picture, and a next button picture in MPEG format.

Each cell comprises NV_PCK made of PCI and DSI. PCI includes HLI (highlight information) which retains thumbnail positions, button positions, highlight color, and highlight shift information in effect when four-way buttons are operated. These data items are recorded suitably to implement diverse menu screens.

FIG. 10 depicts typical menu screens displayed on the LCD 38. Menu screens are called up by operating a menu key, one of the operation keys provided. A highlighted part is shifted by operating four-way keys. Pushing an enter key at the center of the four-way keys starts reproduction of the selected title (VTS) or turns pages.

In practice, calling up the first page displays a menu screen made of six thumbnails each portraying a specific scene. If, say, the top leftmost thumbnail screen is selected by operating the four-way keys, the selected screen is highlighted. Pushing the enter key enlarges the highlighted thumbnail screen and starts reproduction of the corresponding title.

Pushing the next button displays the next intermediate page on a menu screen composed of six thumbnails each picturing a scene. The highlighted part is shifted from one thumbnail to another by operating the operation keys, and the desired thumbnail is decided on by pushing the enter key. The title represented by the highlighted thumbnail thus entered is then reproduced.

Continuously pushing the next button leads eventually to displaying the menu screen on the last page made of six thumbnails each depicting a scene. One of the thumbnails is then selected as described above and the corresponding title is reproduced.

Where the format of the above-described structure is in use, the menu recording structure created at the time of finalizing may be altered by means of a program. Specifically, the stored program may be modified in order to select a desired menu display form in keeping with the user's preferences and the type of the content to be viewed.

Figure 11:
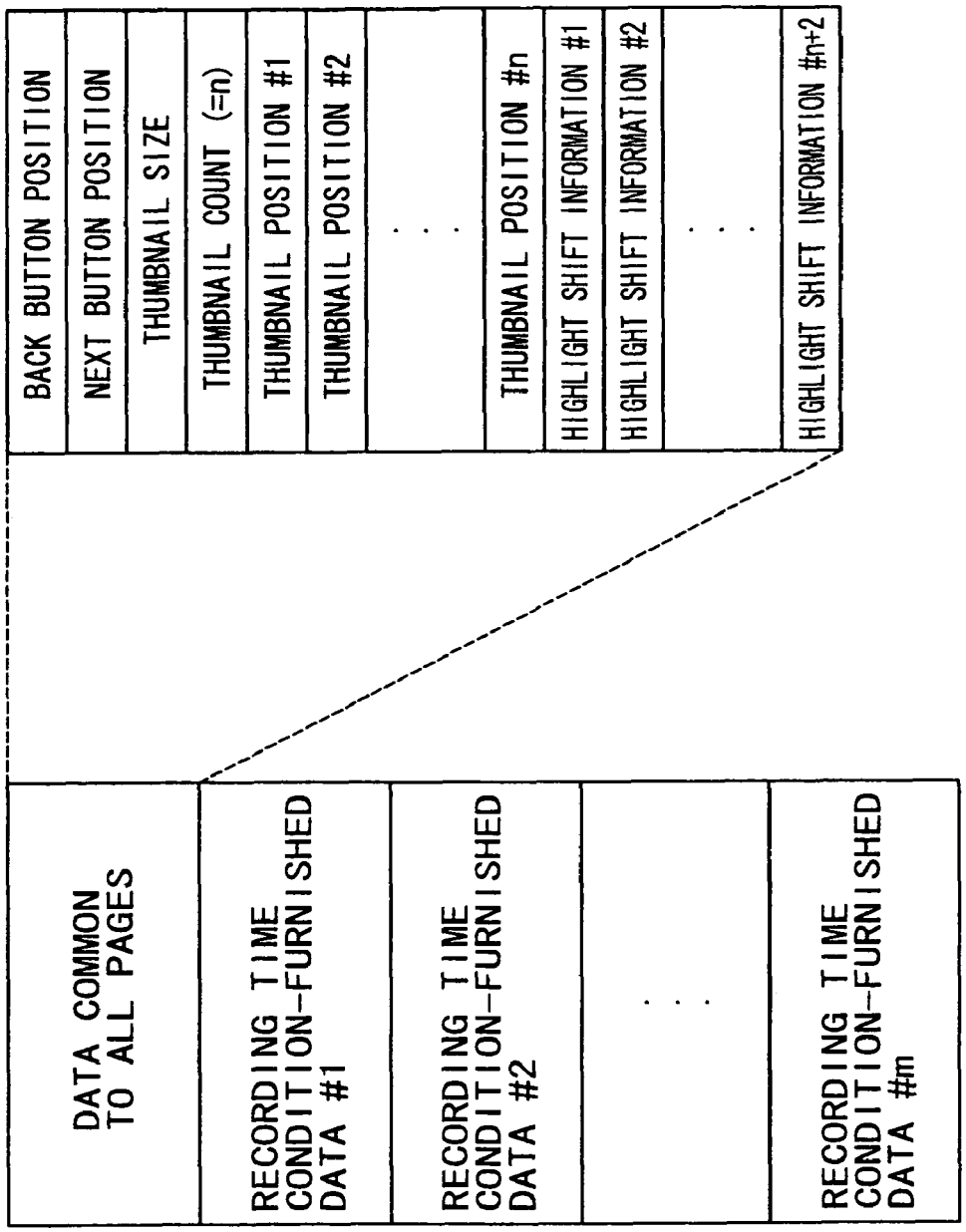
FIG. 11 is an explanatory view presenting a structure of a program for generating menu screens.

How the program is structured will now be described with reference to FIGS. 11, 12, 13 and 14. As shown in FIG. 11, the data structure of the program is constituted by two categories of data: data common to all pages, and recording time condition-furnished data #1 through #m. The data common to all pages make up information which, common to all pages, determines how the pages are to be viewed as they are turned. In practice, the data include the back button position, next button position, thumbnail size, thumbnail count, thumbnail positions #1 through #n, and highlight shift information #1 through #n+2.

The data in FIG. 11 apply where the thumbnail count per page is "n." Each item of the highlight shift information describes the button or the thumbnail to which the highlight is shifted when each of the four-way buttons is operated. There are "n+2" items of highlight shift information because the information also describes the back and next buttons per page.

Figure 12:
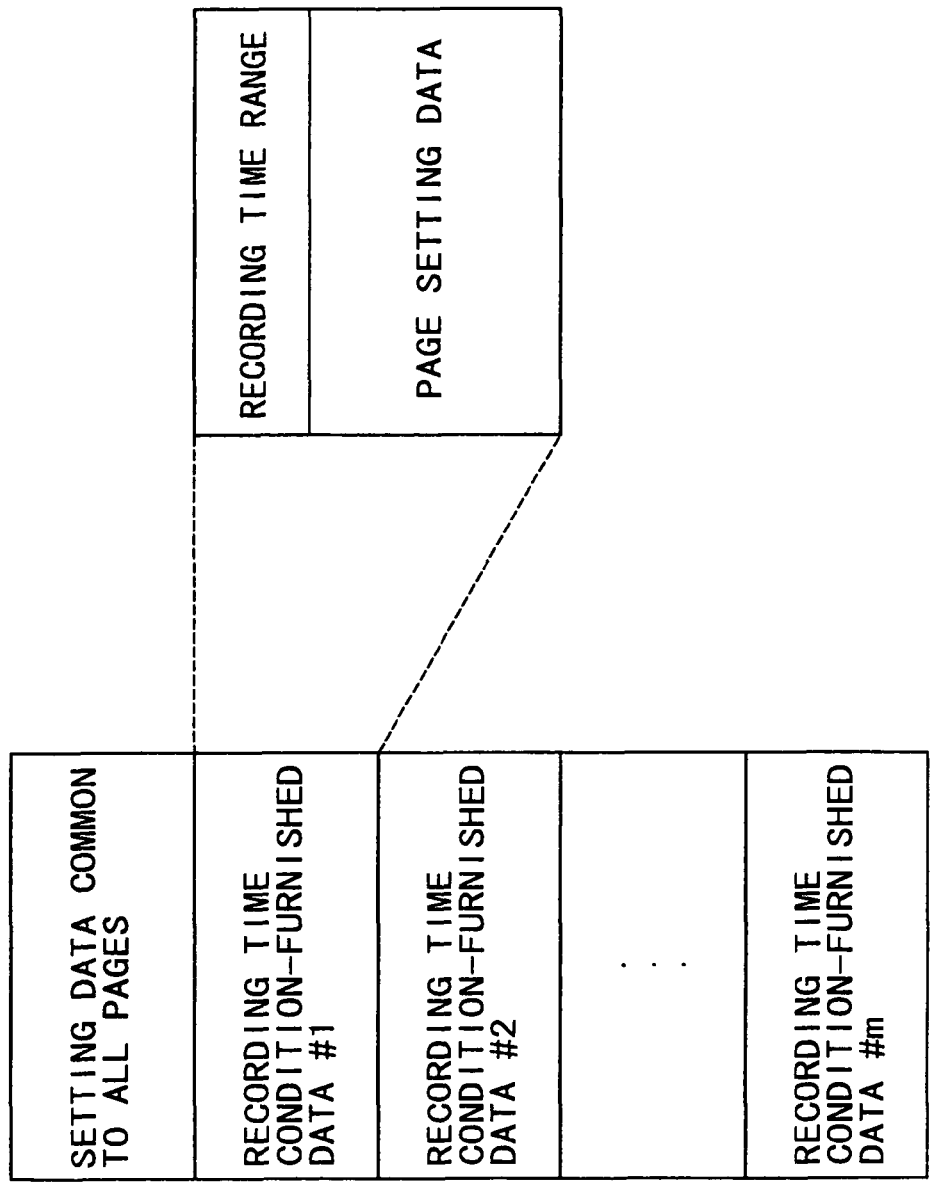
FIG. 12 is an explanatory view sketching another structure of the program for generating menu screens.
Figure 13:
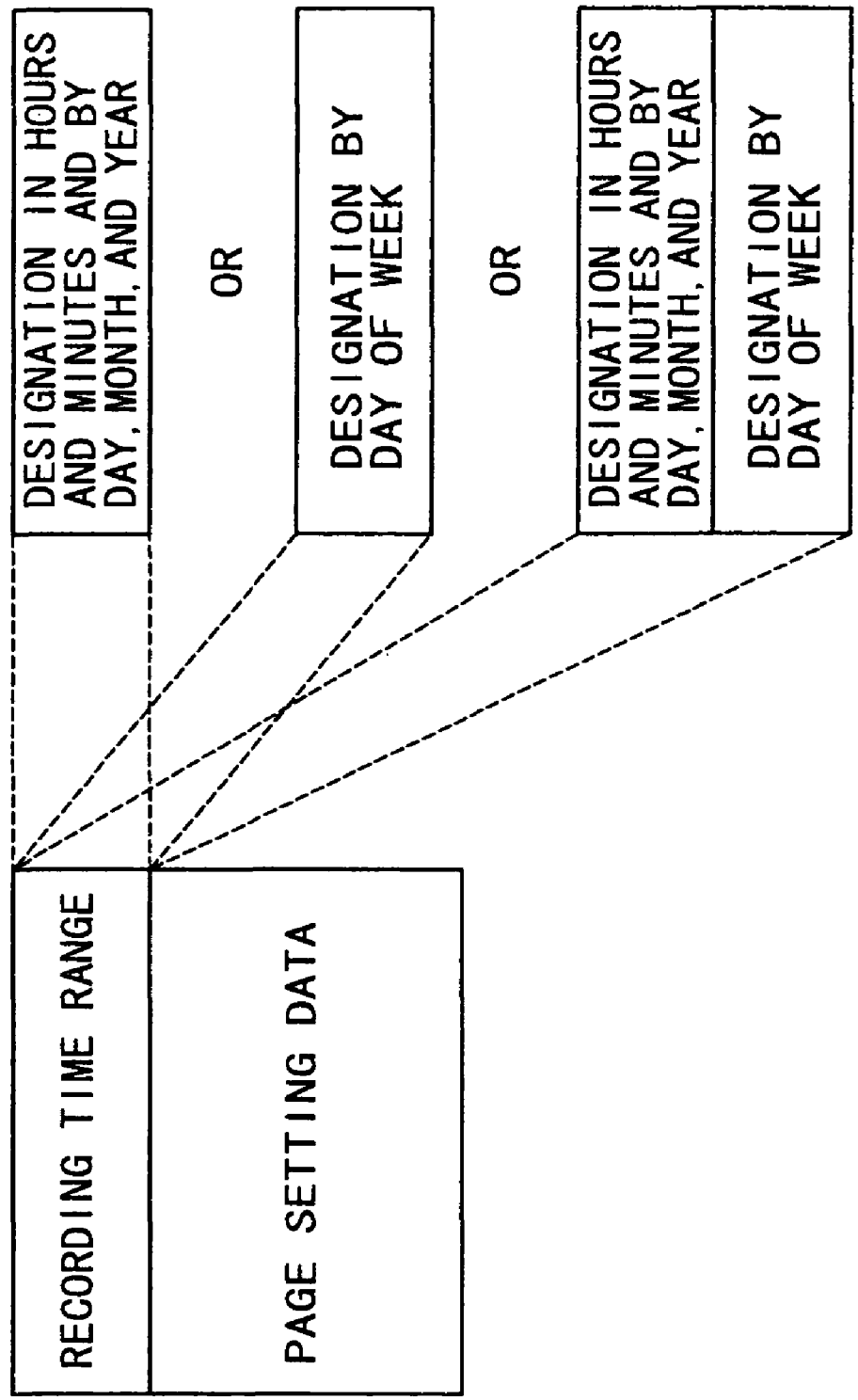
FIG. 13 is an explanatory view outlining another structure of the program for generating menu screens.

Each item of the recording time condition-furnished data is composed of a recording time range and page setting data, as shown in FIG. 12. The recording time range, as depicted in FIG. 13, is composed of one or both of two designations: designation in hours and minutes and by day, month and year; and designation by day of week. When the designated condition is satisfied by the recording time of the title (VTS), the subsequent page setting data become effective.

Figure 14:
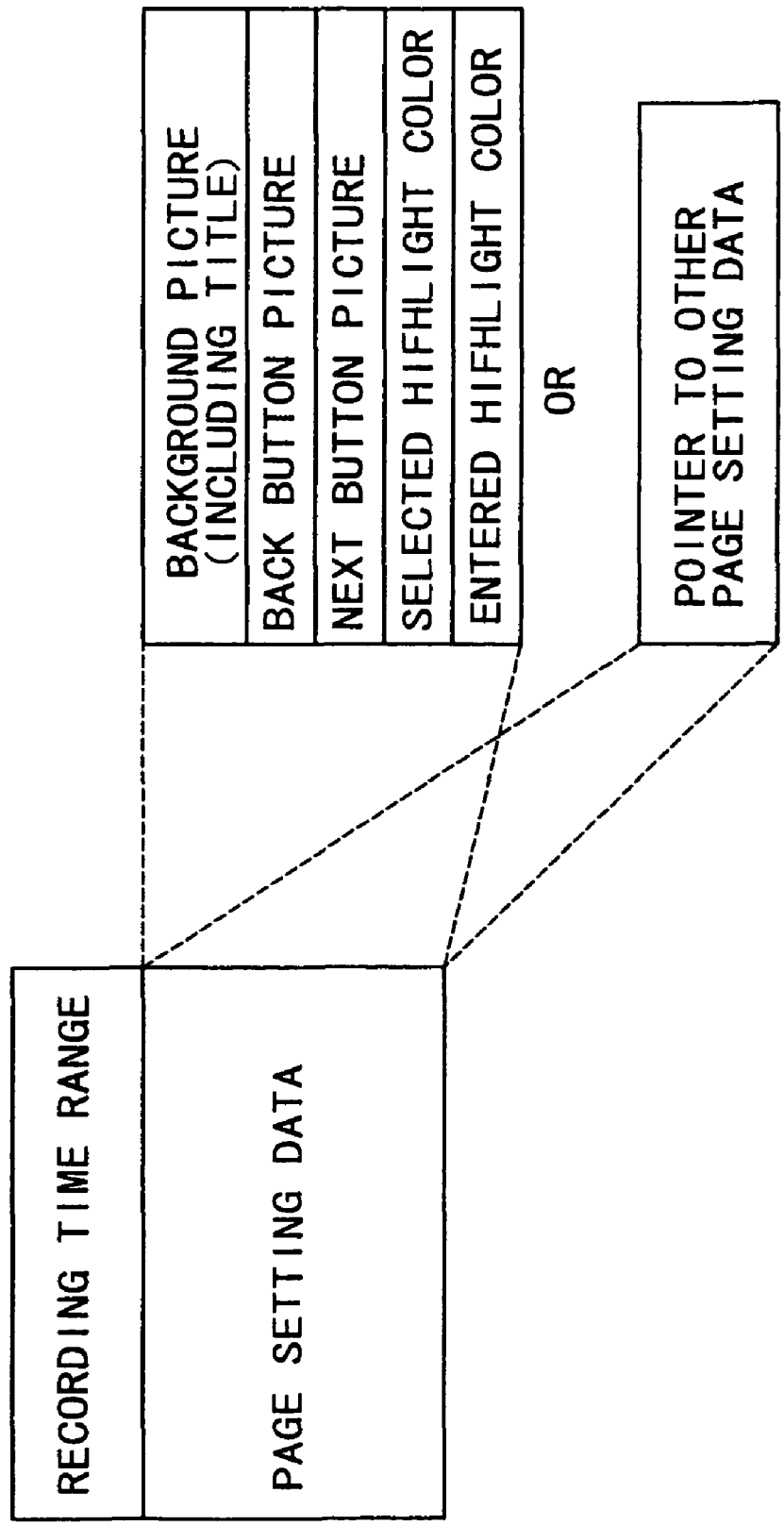
FIG. 14 is an explanatory view representing another structure of the program for generating menu screens.

If the recording time of the title applies to a plurality of recording time ranges, the earliest time range is made effective. The page setting data are used in creating menu information upon finalizing along with the data common to all pages. As shown in FIG. 14, the page setting data are made up of: either a background picture (including titles), a back button picture, a next button picture, a selected highlight color, and an entered highlight color; or a pointer to other page setting data.

The entered highlight color is used to indicate that the key entry has been accepted in response to the enter key being pushed. If there exist the same page setting data, a pointer to that body of data is provided. This structure helps to reduce the amount of the necessary data.

The program of the above structure is installed into the information recording apparatus from the outside through communicative means or from recording media and is referenced upon use. When altered as needed, the program allows menus to appear in diverse ways on display. It is also possible to install a plurality of programs, any one of which may be selected by the user as desired.

FIG. 15 shows a typical data structure of the program. Finalizing what is recorded by use of these data provides the menus to be described below. In the illustrated structure, asterisked (*) fields may be filled with any values.

When a title was recorded between January 1 and January 3 by use of recording time condition-furnished data #1, that title (VTS) is referenced from a menu page called a "Happy New Year" version. The page setting data such as background pictures related to the Happy New Year, as well as page button pictures are referenced in creating the menu screen.

In like manner, titles are finalized using other recording time condition-furnished data. For example, when a title was recorded on June 27 by use of recording time condition-furnished data #2, the pointer to page setting data is arranged to point to recording time condition-furnished data #3, and the title in question is referenced from a menu page called a "Happy Birthday" version.

When a title was recorded on September 13 by use of recording time condition-furnished data #3, that title is referenced from the menu page of the "Happy Birthday" version.

When a title was recorded between December 24 and December 25 by use of recording time condition-furnished data #4, that title is referenced from a menu page called a "Merry Christmas" version.

When a title was recorded on Saturday or Sunday in March through May by use of recording time condition-furnished data #5, that title is referenced from a menu page called a "Spring Holiday" version.

When a title was recorded on a weekday in March through May by use of recording time condition-furnished data #6, that title is referenced from a menu page called a "Spring" version.

When a title was recorded in July through August by use of recording time condition-furnished data #7, that title is referenced from a menu page called a "Summer" version.

When a title was recorded on Saturday or Sunday in September through November except on September 13 by use of recording time condition-furnished data #8, that title is referenced from a menu page called an "Autumn Holiday" version.

When a title was recorded on a weekday in September through November except on September 13 by use of recording time condition-furnished data #9, that title is referenced from a menu page called an "Autumn" version.

When a title was recorded on Saturday or Sunday in December through February next year except on December 24 and 25 by use of recording time condition-furnished data #10, that title is referenced from a menu page called a "Winter Holiday" version.

When a title was recorded on a weekday in December through February next year except on December 24 and 25 by use of recording time condition-furnished data #11, that title is referenced from a menu page called a "Winter" version.

When a title was recorded otherwise, e.g., in June except on June 27 by use of recording time condition-furnished data #12, that title is referenced from a menu page called a "Miscellaneous" version.

When the above program is stored and then modified in keeping with the user's preferences or with the type of the content to be viewed, the way in which the menu screens appear on display can be changed accordingly. Because the menu display of each content can be varied as desired using the program, it is easy to find and reproduce a target content from those recorded on the recording medium.

How the titles of menu-driven data are categorized illustratively by recording time has been discussed so far. Alternatively, titles may be grouped according to the users who recorded them, and menu screens may be created using the corresponding page setting data. As another alternative, menu screens may be created using the page setting data corresponding to the identification information specific to the loaded disc 42.

The menu display form shown in FIG. 15 may be changed as desired by altering the program. For example, the time condition "from January 1 to January 3" may be changed to "from January 1 to January 15," or a particular picture designated by the "Happy New year" version may be replaced by another picture.

Figure 16:
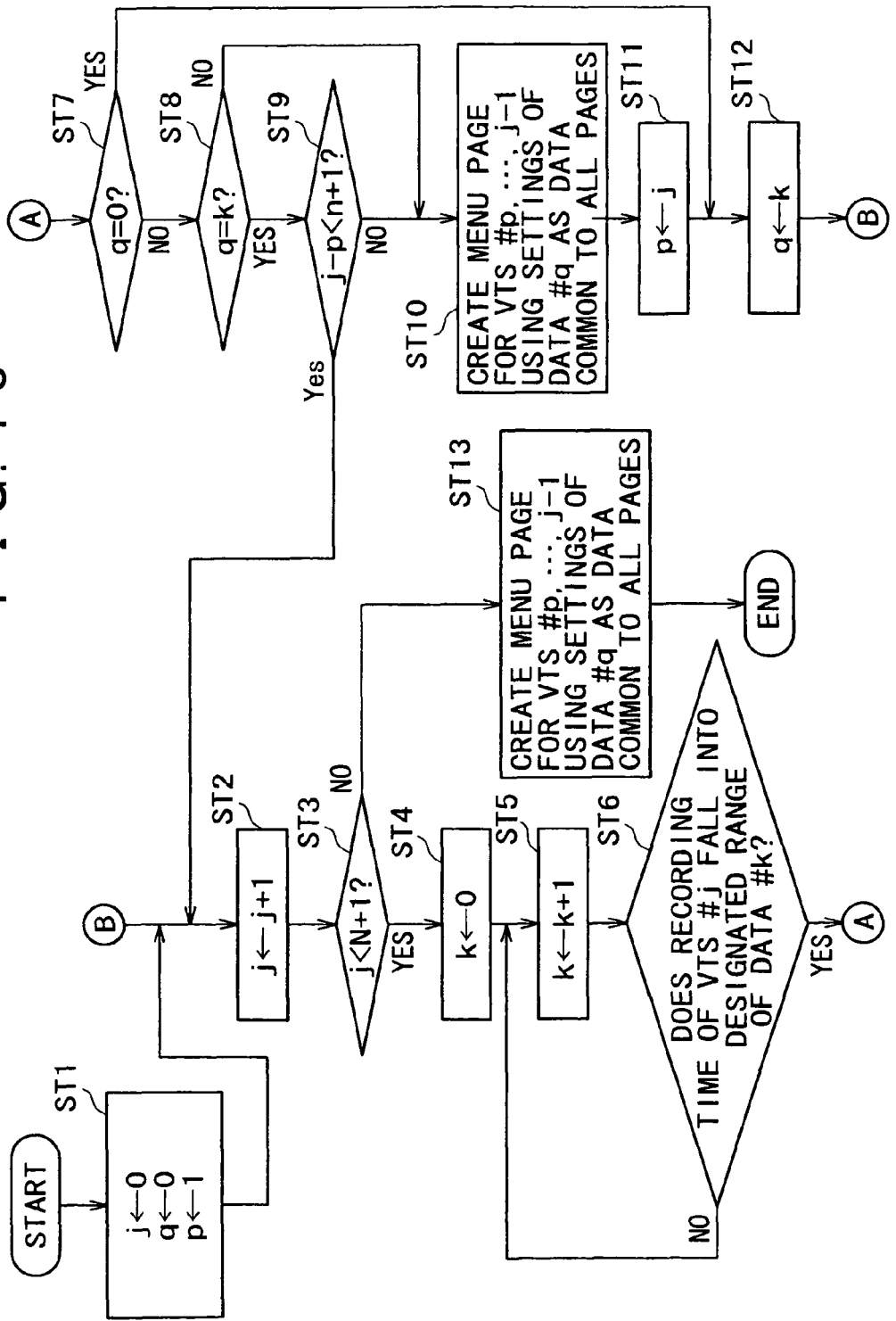
FIG. 16 is a flowchart of steps constituting a menu page creating process.

How menu pages are actually created using the program will now be described with reference to the flowchart of FIG. 16.

In step ST1, three variables are initialized: a variable "j" indicating the number of the VTS being processed, a variable "q" denoting the number of the recording time condition-furnished data being processed, and a variable "p" representing the first VTS number on the menu page being processed.

In step ST2, the variable "j" representative of the VTS number is incremented by 1. In step ST3, a check is made to see whether the variable "j" is smaller than the VTS count N plus 1. If the variable "j" is found to be smaller than the VTS count N plus 1, then step ST4 is reached; otherwise step ST13 is reached.

In step ST4, a variable "k" to be counted is set to zero. In step ST5, the variable "k" is incremented by 1. In step ST6, a check is made to see whether the recording time of VTS #j falls into the recording time range of recording time condition-furnished data #k. If the recording time of VTS #j is found falling into the recording time range of the recording time condition-furnished data #k, then step ST7 is reached; otherwise step ST5 is reached again.

In step ST7, a check is made to see whether the variable "q" denoting the number of the recording time condition-furnished data being processed remains unchanged after being initialized to zero. If the variable "q" is found unchanged, then step ST12 is reached; otherwise step ST8 is reached.

In step ST8, a check is made to see whether there is a match between the recording time condition-furnished data #k corresponding to the recording time of VTS #j on the one hand, and the preceding recording time condition-furnished data #q on the other hand. If a match is recognized, then step ST9 is reached; otherwise step ST10 is reached.

In step ST9, a check is made to see whether a variable (j−p) is smaller than the number of thumbnails (n) accommodated in one page, plus 1. If the variable (j−p) is found smaller than the thumbnail count "n" plus 1, then step ST2 is reached again; otherwise step ST10 is reached.

In step ST10, a menu page referencing VTS #p, #j−1 is created. Step ST10 is followed by step ST11.

In step ST11, the variable "j" is substituted for the variable "p." From step ST11, control is passed on to step ST12.

In step ST12, the variable "k" is substituted for the variable "q." From step ST12, control is returned to step ST2.

In step ST13, a menu page referencing VTS #p, #j−1 is created. This step terminates the processing.

Described above are some examples in which the program for creating menu screens is referenced upon finalizing in order to record the created menu screens to the recording medium in compliance with the DVD-video standard. However, this is not limitative of the invention. The invention may also be practiced where menu screens are not recorded to media; the program may be referenced during reproduction so as to create menu screens. The invention is applicable not only to optical discs such as DVDs but also other recording media such as magnetic recording media and semiconductor memories.

As described, the information recording apparatus and information recording method according to the invention allow menu screens to be created in a manner suitable for contents recorded on the recording medium. This facilitates management of the numerous contents that may be held on the recording medium. The way the menus appear on display may be selected as desired depending on the type of the content of interest. Furthermore, it is possible to search for and reproduce a target content with ease. These features contribute to adding value to the device that incorporates them.

As with contents, the menu screens created by one reproducing device may be recorded on a recording medium in a format enabling reproduction by other reproducing devices. When that recording medium is loaded into another reproducing device for reproduction, what was recorded earlier on the recording medium is reproduced not on a menu screen dependent on the currently-used device but on the menu screens created and recorded initially on the medium.

The inventive information recording apparatus and information recording method also allow a program to be utilized in creating menu screens that are specific to the contents recorded on the recording medium. This likewise facilitates management of the contents that may be retained on the recording medium. The way the menus appear on display may be selected in keeping with the user's preferences or with the type of the content of interest. These features also contribute to adding value to the device that incorporates them.

In addition, the program for creating menu screens or the symbolic pictures such background images constituting the menu screens may be downloaded from an external source over a network or installed upon use from recording media. Such increased availability of these resources contributes to promoting their distribution on the market and to offering a wide choice of visualization options in creating menu screen pictures.

Using the inventive apparatus and method also makes it possible to express the passage of time or the sense of the seasons by changing the format of each menu page depending on the date or the time of day associated with the recorded content.

As many apparently different embodiments of this invention may be made without departing from the spirit and scope thereof, it is to be understood that the invention is not limited to the specific embodiments thereof except as defined in the appended claims.

What is claimed is:

1. An information recording apparatus comprising:
a first recording element for recording input picture information into a recording medium;

a representative data generating element for generating representative data representing said picture information recorded in said recording medium;

a memory for recording a plurality of symbolic pictures which include at least wallpaper pictures;

an associating element for associating a plurality of predetermined periods with respective menu pages, said menu pages being associated with respective symbolic pictures;

a link information generating element for generating link information linking a symbolic picture recorded in said memory with said representative data by selecting said menu page associated with the predetermined period having recording date and time information of corresponding picture information of the representative data; and a picture generating element which, based on said link information, generates overlaid picture information by synthesizing at least said symbolic pictures and said representative data being linked with one another, when the number of said representative data is greater than predetermined number, said picture generating element generates overlaid picture information by using the same symbolic pictures as previous symbolic pictures used for previous representative data.

2. An information recording apparatus according to claim 1, wherein said link information generating element generates said link information based on the recording date and time information and other setting information established upon recording of said input picture information by said first recording element.

3. An information recording apparatus according to claim 1, wherein said link information generating element generates said link information based on the recording date and time information and an identification code specific to said recording medium.

4. An information recording apparatus according to claim 1, further comprising an interface for interfacing with an external device connected via a network, wherein said symbolic pictures is recorded to said memory from said external device through said interface.

5. An information recording apparatus according to claim 1, further comprising an interface for interfacing with an external device connected via a network, wherein said link information generating element utilizes a program which is recorded to a second memory from said external device through said interface.

6. An information recording method comprising:
recording input picture information into a recording medium;
generating representative data representing said picture information recorded in said recording medium;
recording a plurality of symbolic pictures which include at least wallpaper pictures in a memory;
associating a plurality of predetermined periods with respective menu pages, said menu pages being associated with respective symbolic pictures;
generating link information linking a symbolic picture recorded in said memory with said representative data by selecting said menu page associated with the predetermined period having recording date and time information of corresponding picture information of the representative data; and
based on said link information, generating overlaid picture information by synthesizing at least said symbolic pictures and said representative data being linked with one another,
when the number of said representative data is greater than predetermined number, said picture generating element generates overlaid picture information by using the same symbolic pictures as previous symbolic pictures used for previous representative data.

7. An information recording method according to claim 6, wherein said link information is generated based on the recording date and time information and other setting information established upon recording of said input picture information to said recording medium.

8. An information recording method according to claim 6, wherein said link information is generated based on the recording date and time information and an identification code specific to said recording medium.

9. An information recording method according to claim 6, wherein said symbolic pictures is recorded to said memory from an external device through an interface.

10. An information recording method according to claim 6, wherein a program for generating link information is recorded to a second memory from an external device through an interface.

11. The information recording apparatus according to claim 1, wherein said link information generating element generates said link information based on the recording date and time information and position information.

12. The information recording apparatus according to claim 1, wherein said link information generating element generates said link information based on the recording date and time information and user information.

13. The information recording apparatus according to claim 1, wherein the overlaid picture information generated by the picture generating element is a menu screen.

* * * * *